United States Patent

Blard et al.

[11] Patent Number: 5,944,157
[45] Date of Patent: Aug. 31, 1999

[54] FRICTION CLUTCH, IN PARTICULAR FOR A MOTOR VEHICLE, INCLUDING A WEAR COMPENSATING DEVICE

[75] Inventors: Michel Blard, Issy-Les-Moulineaux; Jacques Thirion De Briel, Colombes, both of France

[73] Assignee: Valeo, Paris, France

[21] Appl. No.: 09/068,135

[22] PCT Filed: Sep. 17, 1996

[86] PCT No.: PCT/FR97/01645

§ 371 Date: May 6, 1998

§ 102(e) Date: May 6, 1998

[87] PCT Pub. No.: WO98/12446

PCT Pub. Date: Mar. 26, 1998

[30] Foreign Application Priority Data

Sep. 17, 1996 [FR] France ................................. 96 11297
Dec. 26, 1996 [FR] France ................................. 96 16043

[51] Int. Cl.[6] ............................. F16D 13/75; F16D 13/72
[52] U.S. Cl. ................................. 192/70.12; 192/70.25; 192/111 A; 192/113.23
[58] Field of Search ........................... 192/70.12, 70.25, 192/111 A, 113.2, 113.23

[56] References Cited

U.S. PATENT DOCUMENTS

| 4,865,174 | 9/1989 | Takeuchi | 192/70.12 |
| 5,320,205 | 6/1994 | Kummer et al. | 192/70.25 |
| 5,690,203 | 11/1997 | Link et al. | 192/70.25 |
| 5,816,379 | 10/1998 | De Briel et al. | 192/70.25 |
| 5,823,312 | 10/1998 | Reik et al. | 192/70.25 |

FOREIGN PATENT DOCUMENTS

| 2424442 | 11/1979 | France . |
| 2739159 | 3/1997 | France . |
| 2022729 | 12/1979 | United Kingdom . |

*Primary Examiner*—Richard M. Lorence
*Attorney, Agent, or Firm*—Liniak, Berenato, Longacre & White

[57] ABSTRACT

The friction clutch, for a vehicle, comprises a friction disc, a pressure plate (1), a cover plate (2), and an axially acting diaphragm (3) working between the cover plate (2) and the pressure plate (1), the pressure plate (1) being fixed to the cover plate (2) for rotation with it, while being displaceable axially with respect thereto and being subjected to the action of biassing tongues (9) for returning the pressure plate (1) axially towards the cover plate (2), the said clutch further comprising a wear compensating device which includes circumferentially disposed ramps (11) adapted to be driven in rotation by a set of teeth (18), which they carry at their periphery and with which a worm (13) cooperates, a ratchet wheel (20) being provided for driving the worm (13) in rotation: the ramps (11) have ventilating apertures (16A).

10 Claims, 3 Drawing Sheets

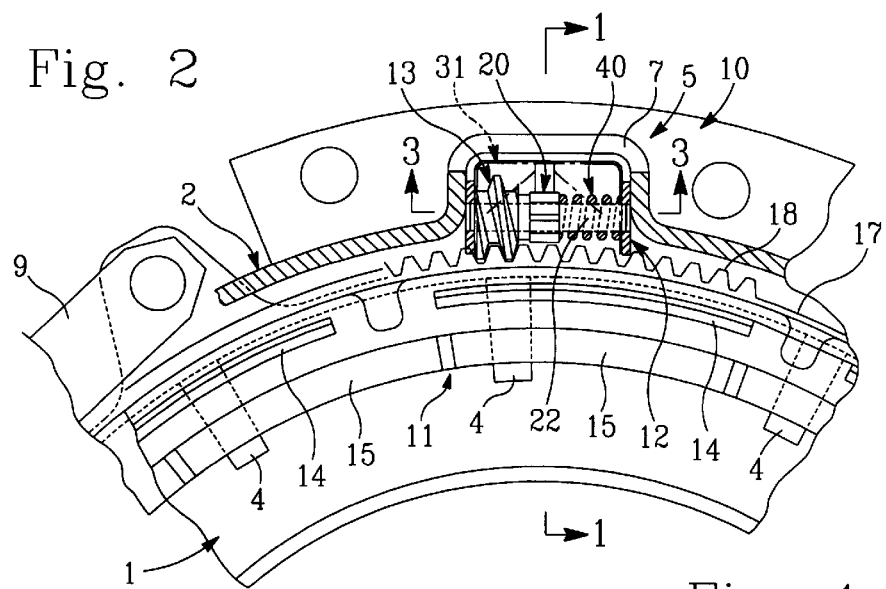
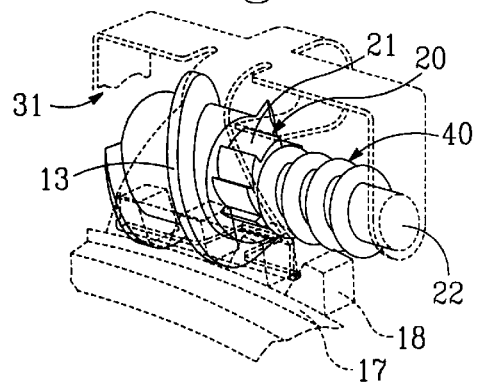
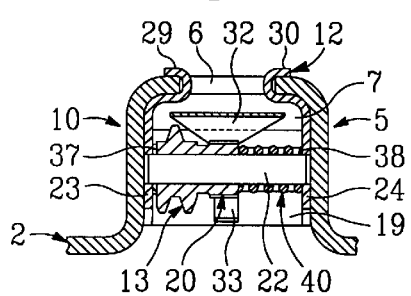
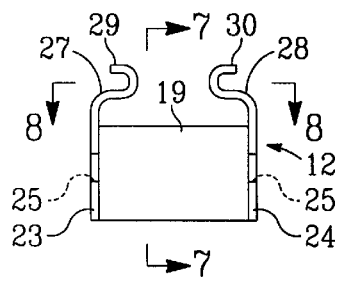
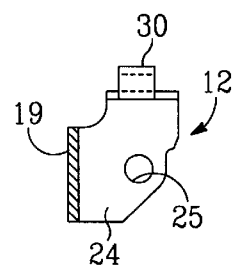
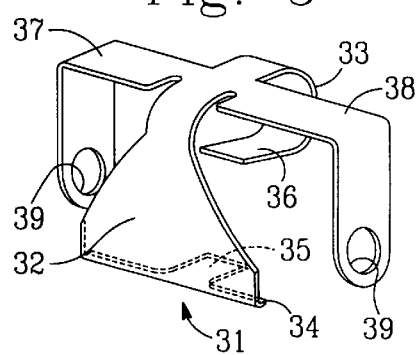
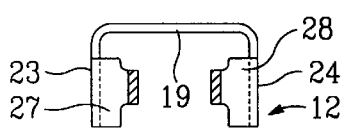

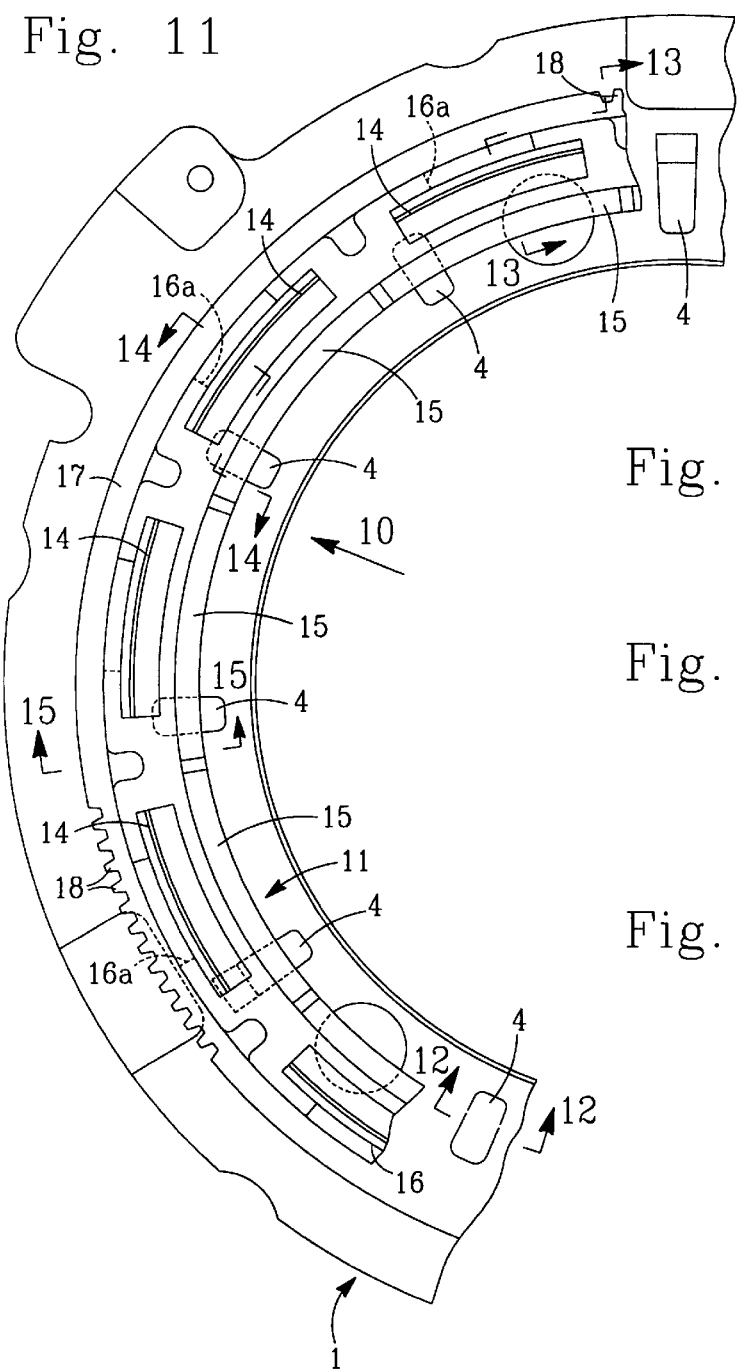
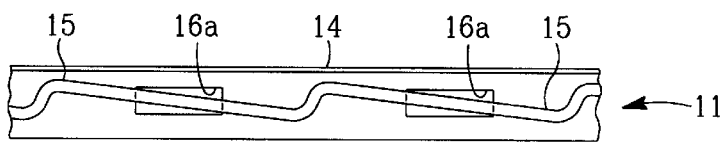
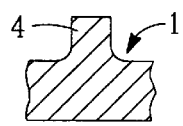
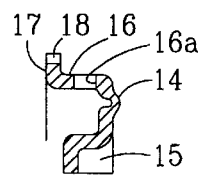
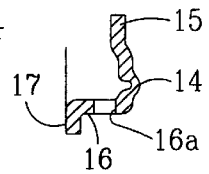
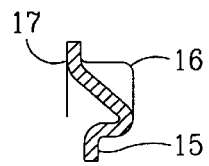

FRICTION CLUTCH, IN PARTICULAR FOR A MOTOR VEHICLE, INCLUDING A WEAR COMPENSATING DEVICE

The present invention relates to a friction clutch, in particular for a motor vehicle, and more particularly it relates to a clutch equipped with a wear compensating device for compensating for wear, in particular wear in the friction liners, the said device, referred to hereinafter as a wear compensating device, operating as the said liners become worn.

A conventional friction clutch generally includes a reaction plate, which may be in two parts so as to constitute a torsion damper, and which is mounted in rotation on a first shaft, which is typically a driving shaft such as the crankshaft of the internal combustion engine and which supports, through its outer periphery, a cover plate to which at least one pressure plate is attached.

The pressure plate is coupled in rotation to the cover plate and to the reaction plate, while being able to be displaced axially under the action of controlled axially acting resilient means, consisting generally of a metallic diaphragm which bears on the cover plate, while a friction disc, carrying friction liners at its outer periphery and fixed in rotation to a shaft, typically a driven shaft such as the input shaft of the gearbox, is interposed between the pressure plate and the reaction plate in such a way as to be gripped between them when the clutch is in an engaged condition. The diaphragm controls the axial displacement of the pressure plate when it is actuated by a clutch release bearing. More precisely, the clutch release bearing acts on the device for disengaging the clutch (the fingers of the diaphragm), which therefore counteracts the action of the means for disengaging the clutch (the peripheral part of the diaphragm, in the form of a Belleville ring) acting on the pressure plate.

In the course of the useful life of such a clutch, the friction liners become worn along with the counter materials, i.e. the pressure plate and reaction plate, and this causes variation to take place in the position of the pressure plate and those of the axially acting resilient means and the clutch release bearing, from which there follows a variation in the gripping force exerted between the friction disc on the one hand and the pressure and reaction plates on the other hand, because of the changes that take place in the working conditions (or positions) of the diaphragm, and the force necessary to disengage the clutch is consequently affected. By equipping such a clutch with a wear compensating device, these drawbacks are avoided, the diaphragm and the clutch release bearing, which is typically in constant engagement on the diaphragm, occupying generally the same position when the clutch is in its engaged condition.

There has previously been proposed, in the French patent application filed on Sep. 21, 1995 under the number 95 11090 and published under the number 2 739 159, a friction clutch, especially for a motor vehicle, of the kind comprising a reaction plate adapted to be mounted in rotation on a driving shaft, a friction disc carrying friction liners at its outer periphery and adapted to be mounted in rotation on a driven shaft, a pressure plate, a cover plate fixed on the reaction plate, axially acting resilient means acting between, firstly, the cover plate, and secondly, the pressure plate through abutment means, the pressure plate being fixed in rotation to the cover plate (2) while being able to be displaced axially with respect thereto and being subjected to the action of resilient return means for returning the pressure plate axially towards the cover plate, the said clutch further including a wear compensating device comprising circumferentially disposed ramp means located axially between the abutment means and the pressure plate and adapted to be driven in rotation by means of a set of teeth, which they carry at their periphery and with which a worm cooperates, means for driving the worm in rotation being provided and being rendered operational by wear in the friction liners when the clutch is engaged.

These clutches do give satisfaction. However, it will be understood that the precision and reliability of the wear compensation depend on the operating integrity of the ramp means; since the latter are located in the heart of the clutch, they are subjected to high temperatures and can become deformed.

An object of the present invention is to overcome these drawbacks.

Thus, according to the invention, a friction clutch of the above type is characterised by the fact that the ramp means have ventilating apertures.

Advantageously, the ramp means consist of an annular ring having ramps which are inclined and spaced apart circumferentially; the pressure plate has pads or ramps adapted to cooperate with the ramps of the ramp means.

Advantageously, the said annular ring also has engagement zones consisting of the rounded upper edge of pressformed projecting elements disposed on an arc of a circle centred on the axis of the clutch and located radially outwardly with respect to the ramps.

Preferably, the ramp means have an axial flange which is provided with ventilating apertures.

Advantageously, the axial flange centres the ramp means with respect to the pressure plate.

Advantageously, each aperture is in line with a ramp.

Preferably, there are the same number of apertures as there are ramps.

The axially acting resilient means consist either of a diaphragm or of Belleville rings mounted in series.

Advantageously, the worm and the means for driving the worm in rotation are carried by the support fixed to the cover plate, and the means for driving the worm in rotation are controlled by the diaphragm.

The clutch may be of the push-to-release or pull-to-release type.

For a better understanding of the subject matter of the invention, some embodiments, shown in the attached drawings, will now be described by way of purely illustrative and non-limiting example.

FIG. 2 is a partial view of the clutch, in cross section taken on the line II—II in FIG. 1 and partly cut away;

FIG. 3 is a partial view in cross section taken on the line III—III in FIG. 2;

FIG. 4 is a perspective view of the compensating device without its support piece;

FIG. 5 is a perspective view showing the resilient member;

FIGS. 6 to 8 show the support piece of the compensating device; FIG. 6 is a plan view, FIG. 7 is a view in cross section taken on the line VII—VII in FIG. 6, and FIG. 8 is a view in cross section taken on the line VIII—VIII in FIG. 6;

FIG. 9 is a plan view showing part of the finger for actuating the diaphragm;

FIG. 10 is a side view in the direction of the arrow X in FIG. 11, showing the ramp means;

FIG. 11 is a plan view, partly cut away, of the clutch without its diaphragm;

FIG. 12 is a view in cross section taken on the line XII—XII in FIG. 11;

FIG. 13 is a view in cross section taken on the line XIII—XIII in FIG. 11;

FIG. 14 is a view in cross section taken on the line XIV—XIV in FIG. 11;

FIG. 15 is a view in cross section taken on the line XV—XV in FIG. 11;

in FIG. 16 the clutch is disengaged with new liners; in FIG. 17 the clutch is engaged with worn liners; in FIG. 18 the clutch is disengaged with worn liners, and in FIG. 19, the clutch is engaged, with wear taken up.

Figure 1:
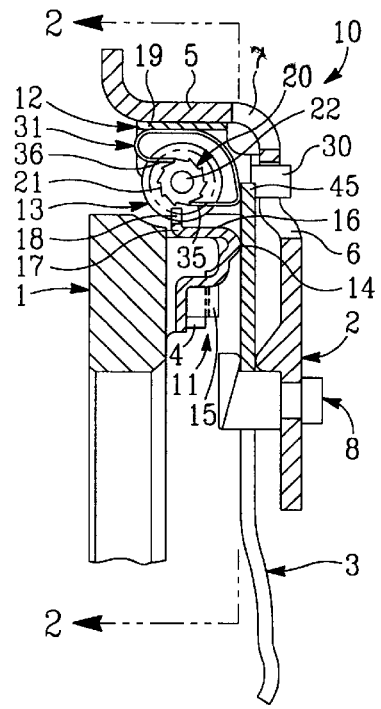
FIG. 1 is a view in cross section taken on the line II in FIG. 2, showing part of a clutch equipped with a wear compensating device in accordance with the invention.

In the drawings, the diaphragm clutch 3 includes a hollow cover plate 2 having a base, together with means for fastening it to a reaction plate, which may be of divided form so as to constitute a torsion damper; the cover plate is in the general form of a hollow dish, and includes at its outer periphery a radial flange which constitutes means for fastening the cover plate to the reaction plate, the said flange being formed with holes for passage through them of fastening members such as screws, for fastening the cover plate to the reaction plate.

In the present case, the clutch is of the push-to-release type, that is to say it is necessary to exert a pushing force, with the aid of a clutch release bearing not shown, on the inner ends of the fingers of the diaphragm 3 so as to disengage (or declutch) the clutch. In general terms, the fingers of the diaphragm constitute declutching means for counteracting, under the action of the clutch release bearing, the action of the resilient clutch engaging means constituted by the peripheral portion of the diaphragm, which is in the form of a Belleville ring. To this end, the base of the cover plate 2 carries, firstly, a primary abutment consisting of a projecting element formed in the base of the cover plate at the inner periphery of the latter, and secondly, facing the primary abutment, a secondary abutment in the form of heads of short posts 8. The diaphragm 3 is mounted for tilting deflection, through the inner periphery of its Belleville ring, between the said primary and secondary abutments. It is in contact through the outer periphery of its Belleville ring with the engagement zones 14 to be described below.

With reference to FIGS. 1 and 2, these show a friction clutch mechanism, especially for a motor vehicle, which includes a pressure plate 1, arranged to cooperate with a friction disc, not shown, which carries friction liners at its outer periphery and which itself cooperates with a reaction plate. The reaction plate, not shown, is arranged to be mounted in rotation on a driving shaft such as a crankshaft of the internal combustion engine. The friction disc is fixed in rotation to a driven shaft such as an input shaft of the gearbox, and is shown diagrammatically, for example in the document FR-A-2 739 159 mentioned above, its friction liners being conventionally associated with a progressive engagement device.

The pressure plate 1 is fixed in rotation to a hollow cover plate 2 by means of tangential tongues 9 which, being elastic, also constitute return means for biasing the pressure plate 1 towards the cover plate 2, which in this case is of metal and press-formed from plate.

The pressure plate 1, while being fixed in rotation to the cover plate 2, is therefore displaceable axially with respect to the cover plate 2 under the action of controlled, axially acting, resilient means, which in this example consist of a diaphragm 3 articulated on the cover plate 2, in the manner described above, by means of short posts 8 carried by the base of the cover plate 2, the latter having a central hole. In the known way, the short post 8 has a profiled head which offers a secondary abutment to the diaphragm in facing relationship with a primary abutment which is formed by press-forming the base of the hollow cover plate 2.

In order to maintain the axially acting resilient means 3 in a position when the clutch is engaged which is independent of the wear of the liners of the friction disc, and to a lesser extent the wear in the pressure plate 1 and the reaction plate, the so-called friction faces of which become worn by contact with the liners of the disc, a wear compensating device 10 is provided.

The wear compensating device 10 comprises ramp means 11 which are disposed circumferentially; more precisely, these ramp means 11, which are best seen in FIGS. 2 and 10, consist of an annular ring of press-formed sheet metal, such as to have ramps 15 disposed circumferentially; the said ring also has engagement zones 14 which consist of the rounded upper edge of arcuate press-formed projecting elements centred on the axis of the clutch and located radially on the outside with respect to the ramps 15.

The pressure plate 1 has, in this example formed integrally by moulding, on its surface that faces towards the base of the cover plate 2, and radially outside the short posts 8, pads 4 which are spaced apart circumferentially at a distance from each other which corresponds to the distance that circumferentially separates two successive ramps 15, with each of the pads 4 being arranged to cooperate with a ramp 15.

The ramp means 11 are located axially between the diaphragm 3 and the pressure plate 1, so that the pads 4 receive the ramps 15, and the diaphragm 3 cooperates with the engagement zones 14, which thus constitute the abutment means through which the diaphragm 3 acts on the pressure plate 1. This arrangement is inexpensive and simple, the ramp means 11 being of metal and obtained by press-forming, while the pads 4 are cast integrally with the pressure plate 1 and assist ventilation.

One of the engagement zones 14 of the ramp means 11 is extended (FIGS. 1 and 13) at its outer periphery by a flange 16 which is parallel to the axis of the clutch and which terminates in a return portion 17 which is transverse, that is to say it lies in a plane at right angles to the axis of the clutch, and which has at its periphery a set of teeth 18, such that the engagement zones 14 can be continuous, and the flange is centred by a thickened portion of the pressure plate 1.

In accordance with the invention, the axial flange 16 of the ramp means 11 has apertures 16A, which are rectangular in this example, for facilitating ventilation of the ramp means.

As can be seen in FIG. 11, there are the same number of apertures 16A as there are ramps 15, and the apertures 16A are situated in line with the ramps 15, preferably centrally with respect to the ramps 15.

The wear compensating device 10 also includes a ratchet wheel 20 having ratchet teeth 21 and being fixed to a shaft 22, which also carries a worm 13, which in the present case is disposed tangentially with respect to the set of teeth 18; the angle and pitch of the worm 13 are matched to the set of teeth 18 of the ramp means 11; the worm 13 is arranged to cooperate tangentially with a set of teeth 18 under the conditions which will be described later herein.

The shaft 22 of the ratchet wheel 20 is carried in rotation by a support piece 12, which is best seen in FIGS. 6 to 8 and which is fabricated by stamping out and bending in metal plate, being U-shaped with a spine portion 19 and two wing portions 23, 24 for supporting the shaft 22; for this purpose, each of the wing portions has a circular hole 25 which is matched to the diameter of the shaft 22.

The wing portions 23, 24 of the support piece 12 are extended outwards by L-shaped arms 27, 28, which extend towards each other at right angles to the spine portion 19, and each of which terminates, when the support piece 12 is mounted on the cover plate 2, in a C-shaped end portion 29 and 30 respectively, the two C-shaped end portions 29 and 30 being disposed back to back and in line with each other.

The cover plate 2 has a radial projecting element 5 which defines a housing for the wear compensating device 10; this housing communicates with the outside through a transverse aperture 6 formed through the transverse wall of the cover plate 2; the edges of this transverse aperture 6 are adapted to receive the C-shaped end portions 29 and 30 of the support piece 12 which are seamed on these edges as shown in FIG. 3, and which therefore secure the support piece 12 on the cover plate; FIGS. 1, 2 and 3 show that the support piece 12 fits perfectly in the housing defined by the radial projecting portion 5, the said housing and the support piece 12, which is of metal in this example, these elements having complementary forms; at the junction between the transverse wall of the cover plate and the extension of the cylindrical skirt of the cover plate that bounds the said housing, an aperture 7 facilitates ventilation of the device 10. The support piece 12 is mounted radially outside the pressure plate 1.

The support piece 12 is adapted to receive a resilient member 31 which is of smaller thickness than the support piece 12, as is best seen in FIGS. 4 and 5; the resilient member 31, which is of metal in this example, has the general form of a crook, each end of which carries an inwardly directed return portion; more precisely, the portion 32 of the crook having the greater length is extended in width towards its end, terminating in a return portion 34 which carries a terminal controlled tongue 35 constituting a control member; the shorter portion 33 of the crook has a return portion 36, which will be called a non-return catch and which extends generally parallel to the control tongue 35 but spaced away from the latter, in such a way that, when the resilient member 31 and the ratchet wheel 20 are mounted in the support piece 12, the non-return catch 36 and the control tongue 35 each cooperate with the root of a tooth, the two teeth concerned being in this example substantially diametrically opposed as shown in FIG. 1; for its mounting in the support piece 12, the resilient member 31 carries laterally extending stirrup arms 37, 38, disposed on either side of the resilient crook-shaped part and extending orthogonally with respect to the latter, while the free ends of the stirrup arms 37, 38 have through holes 39, the diameter of which corresponds to that of the shaft 22.

When the resilient member 31 is mounted in the support piece 12, the free ends of the arms 37, 38 lie between the wing portions 23, 24 of the support piece 12 and along these latter; a helical compression spring 40 is placed between the ratchet wheel 20 and the free end of the arm 38, being wound around the shaft 22; the worm 13 and the ratchet wheel 20 are formed in the same component; as can be seen, the support piece 12 equipped with this component, together with the resilient member 31, spring 40 and shaft 22, constitutes a subassembly ready to be installed within the cover plate 2.

The helical spring 40 constitutes the resilient means for taking up wear, as described below; the ratchet wheel 20 is in line with the non-return catch 36 which, by cooperation with the ratchet teeth 21 of the ratchet wheel 20, prevents the ratchet wheel and the worm 13 from turning in the anti-clockwise direction with reference to FIGS. 1 and 16 to 19.

Since the support piece 12, carrying the ratchet wheel 20, the worm 13 and the helical spring 40, is fixed to the cover plate 2, the diaphragm 3 is displaced with respect to it during operations of disengaging and re-engaging the clutch; the diaphragm 3 carries at its periphery a radial finger 45, FIG. 9, referred to as an actuator, which projects radially outwardly from the Belleville ring portion of the diaphragm 3, for cooperation with the widened zone of the wider portion 32 of the resilient member 31; it will be understood that, because of this arrangement, during the tilting deflection of the diaphragm 3 during disengaging and re-engaging of the clutch, the actuator 45 displaces this portion 32 from right to left with respect to FIG. 1, and the control tongue 35, by cooperation with the teeth 21 of the ratchet wheel 20, is caused to turn the ratchet wheel 20 in the clockwise direction; when the actuator 45, on the return movement, is displaced from left to right, the elasticity of the portion 32 of the resilient member 31, together with the inclination of the teeth 21, cause the said portion 32 to be displaced towards the right, so as to climb on the teeth 21 which are held fixed in rotation by the non-return catch 36 and/or by internal friction.

The wear compensating device which has just been described operates in the following way, given that the system consisting of the worm 13 and the set of teeth 18 is irreversible and the worm 13 is irreversible, the worm 13 being able to drive the teeth 18 and not the other way round.

FIG. 1 shows the clutch engaged, with the liners of the friction disc being new and being gripped between the reaction plate, not shown, and the pressure plate 1. In this position, the control tongue 35 and the non-return catch 36, being both elastically deformable, have their ends at the root of a tooth of the ratchet wheel 20.

Figure 16:
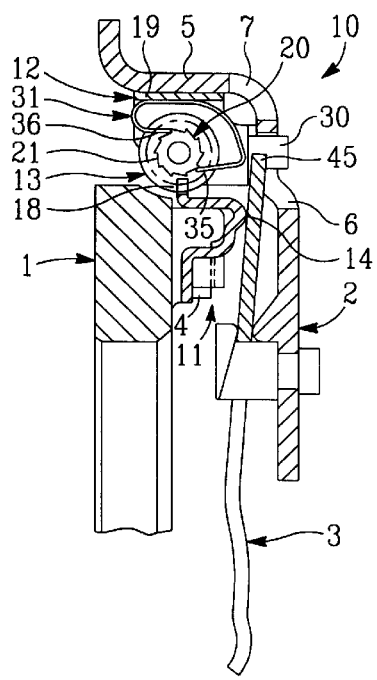
FIGS. 16 to 19 are views in partial cross section similar to FIG. 1 and showing various positions of the constituent elements of the clutch.

When the clutch is disengaged, the diaphragm 3 has deflected about the short posts 8, thereby taking its actuating finger 45, at its periphery, towards the base of the cover plate 2; in its displacement the actuator 45 progressively releases the control tongue 35, the end of which follows the inclined ramp constituted by the tooth at the root of which it was engaged in the preceding step, the teeth 21 of the ratchet wheel 20 being so designed that, during the course of this declutching operation with new liners, the end of the control tongue 35 does not jump a tooth, the non-return catch 36 retaining the ratchet wheel 20; this result is obtained by the portion 32 of the resilient member 31 coming into abutment against the support piece 12, and more precisely against the arms 27, 28 of the support piece 12 which constitute a control abutment, and, in accordance with one feature of the invention, the arms limit the return travel of the said portion 32 regardless of the travel of the actuator 45 of the diaphragm 3, as is shown in FIG. 16.

Figure 17:
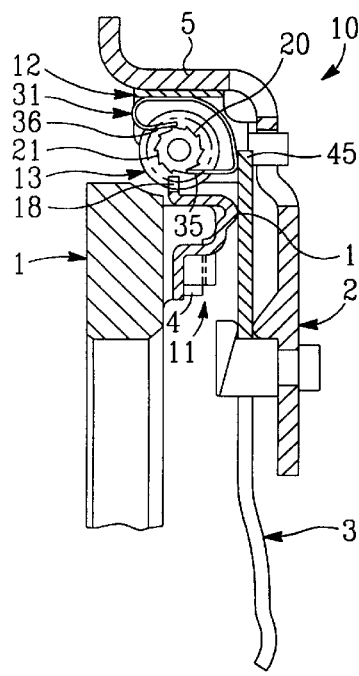
Figure 18:
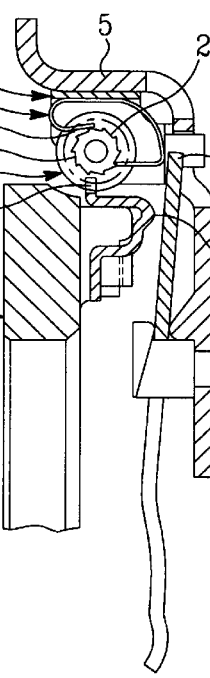

When the liners are worn, the pressure plate 1, still subjected to the axial force from the diaphragm 3, approaches in the known way the reaction plate which is fixed axially, as is the cover plate 2; the actuator 45 of the diaphragm 3 then moves towards the reaction plate, that is to say towards the open end of the cover plate 2, displacing in its movement the control tongue 35; the ratchet wheel 20 turns about its axis in the clockwise direction, in which direction the non-return catch 36 does not perform its function but can jump from one tooth to another; the clutch is shown in FIG. 17 in its engaged condition with worn liners. This driving of the ratchet wheel 20 in rotation also causes the worm 13 to turn by a slight amount on its shaft;

since the ramp means 11 are immobilised with respect to the cover plate 2 because of the load exerted by the diaphragm 3, the worm 13, which meshes with the set of teeth 18 of the ramp means 11, exerts its screw action to some extent on the teeth 18, compressing the helical spring 40, the direction of the thread of the worm 13 being determined accordingly.

During the declutching operation which follows the phase of wear which has just been described, the pressure plate 1 releases the liners, moving away from them under the action of the tangential tongues 9, which return towards the base of the cover plate 2 the pressure plate 1 together with the ramp means 11, which are in contact with the diaphragm 3 through their engagement zones 14 and with the pads 4 of the pressure plate 1 through their ramps 15. The helical spring 40 urges the worm 13 towards the wing portion 23 of the support piece 12, from which it had become disengaged in the wear phases, that is to say from right to left with reference to FIGS. 2 and 3; since the load of the diaphragm 3 is no longer applied on the ramp means 11, the only force to be overcome in order that the ramp means 11 can be turned with respect to the pressure plate 1 is the friction force generated by the return force of the tangential tongues 9; if the load of the helical spring 40 is sufficient to overcome this force, the spring 40 then displaces the worm 13, which is prevented from turning on itself by the pressure from the non-return catch 36, and the worm will drive the teeth 18: by turning on themselves, the ramps 15 of the ramp means 11, by cooperation with the pads 4 of the pressure plate 1, will move the pressure plate 1 away from the base of the cover plate 2, thus increasing the axial distance between the working surface of the pressure plate 1 and the engagement zones 14 of the ramp means 11, and thereby taking up at least part of the displacement of the pressure plate 1 which is due to wear in the liners. Because the load of the helical spring 40 is a function of the amount by which it will have become compressed by the worm 13 during the wear phases, it will be seen that several clutch engaging and disengaging operations may be necessary before the wear compensating device 10 can enter a phase in which wear has properly been taken up, this being a function of the relative dimensioning of the components concerned; by way of example, these latter may be made in such a way that this wear-compensated phase proper occurs for the first time only after wear corresponding to three tens of millimeters has taken place; in FIG. 18, which corresponds to the clutch being disengaged with worn liners, it is supposed that no wear has been taken up; it is also supposed that the amount of wear has been sufficient for the rotation of the ratchet wheel 20 to have been enough for the control tongue 35 to have jumped by one tooth on its return movement.

Figure 19:
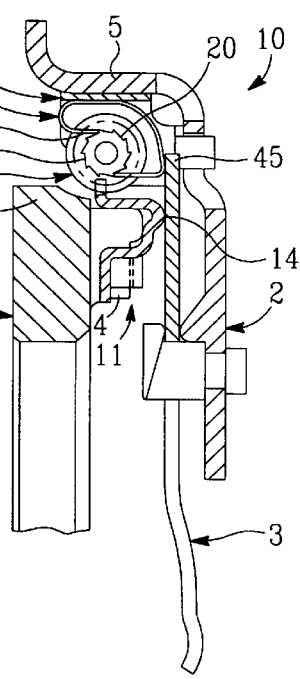

During the clutch engaging operation, the control tongue 35, under thrust from the actuator 45, causes the ratchet wheel 20 to turn, and the ramp means 11, which are no longer gripped by the diaphragm 3, rotate and compensate for the displacement of the pressure plate 1 due to wear; at the end of the wear take-up operation, FIG. 19, the diaphragm 3, the ratchet wheel 20, the non-return catch 36 and the control tongue 35 regain the position which they occupied in FIG. 1.

In the version which has just been described, the worm 13 and the ratchet wheel 20 are formed in one piece; the worm 13 could of course be a separate member provided with a bore, the said bore and the shaft itself being so arranged that the worm is able to slide along the shaft while being fixed to the said shaft in rotation.

In the whole of the foregoing, the non-return means consist of a catch which cooperates with the ratchet wheel; in another version, they consist of friction means, such as friction means for example.

As will have been understood, the distance between the friction surface of the pressure plate, which is the surface of the pressure plate that is designed to cooperate with the friction liners of the friction disc, and the engagement zones 14, increases as wear occurs in the friction liners and the counter-materials, so that the diaphragm occupies the same position.

The pads 4 can have a chamfer for cooperation with the ramp means 11, and more precisely with the ramps 15.

In the drawings, the ramp means 11 are carried so that they are centred by the outer periphery of the pressure plate 1, which is in two parts, namely the pressure plate proper and the ramp means 11.

More precisely, the pressure plate has at its outer periphery a divided boss which projects axially towards the cover plate 2.

This boss is annular in form, and through its outer periphery it serves to centre the axial flange 16, which is in intimate contact through its inner periphery with the outer periphery of the said boss, so as to be centred.

In another version, the ramp means 11 may be centred internally by the pressure plate, and may for this purpose have an internal axial flange.

As will have been understood, the boss of the pressure plate corresponds to a normal boss of a pressure plate in which the end is sectioned so as to form an abutment for the diaphragm, that abutment being replaced by the engagement zones 14.

The pads 4 may of course be replaced by ramps complementary to the ramps 15.

It will be appreciated that the wear compensating device has low sensitivity to axial and torsional vibrations, and especially those due to axial vibrations of the crankshaft of the engine of the motor vehicle. It is also quite insensitive to the effects of centrifugal force and to thermal deformation and corrosion.

In this connection, the irreversibility of the action of the worm on a set of teeth fixed to the ramp means, coupled to the non-return means, prevent accidental operation of the wear compensating device having regard to vibrations, and also when no wear has taken place. Thus, the pressure plate is not able to drive the worm through the ramp means.

The presence of the support piece carried by the cover plate and carrying the control member and the non-return means, in combination with the centring of the ramp means by the pressure plate, enables the wear compensating device to be highly resistant to the effects of centrifugal force.

The assembly consisting of the ratchet wheel, the worm and the helical spring takes up little space, and does not hinder ventilation of the clutch. This ventilation is encouraged by the presence of the apertures in the ramp means, and also by the presence of the pads.

The action of the axially acting resilient means on the control member cooperating with the ratchet means enables the wear compensating device to be disengaged.

The axially acting resilient means may take some other form, for example as described in Applications FR 97 11058 of Sep. 5, 1997, and FR 97 04213 and FR 97 04214 of April 7, 1997.

Thus, with reference to FIGS. 4, 5 and 3, 4 respectively of the documents FR 97 11058 and FR 97 04214, it can be seen that a Belleville ring is mounted in series with the diaphragm so as to constitute the elastic means for engaging the clutch by axial action, the diaphragm being in contact with the control tongue directly or indirectly through the interposed means for transmitting forces that acts between the Belleville ring and the diaphragm.

The Belleville ring is a booster ring of the positive type.

This booster ring is for example dimensioned as a function of the progressive engagement means which are mounted within the friction disc.

The booster ring can of course be fitted in parallel with the diaphragm, for example by acting between the cover plate and the inner ends of the fingers of the diaphragm, in the way described in the document FR-A-2 728 638. In another version, two Belleville rings are mounted in series and are arranged in combination with a declutching member, as is described for example in FIG. 1 of the document FR-97 11058. In that case, it is the Belleville ring of the negative type that bears on the ramp means.

The wear compensating device may of course take some other form. The same is true for the support piece. All of the various embodiments described in Application FR 96 11297 of 17.9.96 may be envisaged. Reference may for example be made to FIGS. 21, 28 and 35 of that Application, the text of which is considered to be annexed to the present Application.

We claim:

1. A friction clutch, comprising a reaction plate adapted to be mounted in rotation on a driving shaft, a friction disc carrying friction liners at its outer periphery and adapted to be mounted in rotation on a driven shaft, a pressure plate (1), a cover plate (2) fixed on the reaction plate, axially acting resilient means (3) acting between, firstly, the cover plate (2), and secondly, the pressure plate (1) through abutment means (14), the pressure plate (1) being fixed in rotation to the cover plate (2) while being able to be displaced axially with respect thereto and being subjected to the action of resilient return means (9) for returning the pressure plate (1) axially towards the cover plate (2), the said clutch further including a wear compensating device comprising circumferentially disposed ramp means (11) located axially between the abutment means (14) and the pressure plate (1) and adapted to be driven in rotation by means of a set of teeth (18), which they carry at their periphery and with which a worm (13) cooperates, means (20) for driving the worm (13) in rotation being provided and being rendered operational by wear in the friction liners when the clutch is engaged, characterised by the fact that the ramp means (11) have ventilating apertures (16A).

2. A friction clutch according to claim 1, characterised by the fact that the ramp means (11) consist of an annular ring having ramps (15) which are inclined and spaced apart circumferentially, the pressure plate (1) having pads (4) or ramps adapted to cooperate with the ramps (15) of the ramp means (11).

3. A friction clutch according to claim 2, characterised by the fact that the said annular ring also has engagement zones (14) consisting of the rounded upper edge of press-formed projecting elements disposed on an arc of a circle centred on the axis of the clutch and located radially outwardly with respect to the ramps.

4. A friction clutch according to claim 1, characterised by the fact that the ramp means (11) have an axial flange (16) which is provided with ventilating apertures (16A).

5. A friction clutch according to claim 4, characterised by the fact that the axial flange (16) centres the ramp means (11) with respect to the pressure plate (1).

6. A friction clutch according to claim 1, characterised by the fact that each aperture (16A) is in line with a ramp (15).

7. A friction clutch according to claim 6, characterised by the fact that there are the same number of apertures (16A) as there are ramps (15).

8. A friction clutch according to claim 1, characterised by the fact that the axially acting resilient means (3) comprise a diaphragm.

9. A friction clutch according to claim 8, characterised by the fact that the worm (13) and the means (20) for driving the worm (13) in rotation are carried by the support (12) fixed to the cover plate (2), and the means (20) for driving the worm (13) in rotation are controlled by the diaphragm (3).

10. A friction clutch according to claim 1, characterised by the fact that the clutch is of the push-to-release type.

* * * * *